(12) United States Patent
Choi et al.

(10) Patent No.: US 11,958,368 B2
(45) Date of Patent: Apr. 16, 2024

(54) APPARATUS FOR PREVENTING SUB-FRAME OF ELECTRIC VEHICLE WITH WIRELESS CHARGING PAD FROM BEING PUSHED BACKWARD

(71) Applicants: HYUNDAI MOTOR COMPANY, Seoul (KR); KIA MOTORS CORPORATION, Seoul (KR)

(72) Inventors: Jong-Hun Choi, Incheon (KR); Seung-Kyu Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 708 days.

(21) Appl. No.: 17/066,833

(22) Filed: Oct. 9, 2020

(65) Prior Publication Data

US 2021/0370782 A1 Dec. 2, 2021

(30) Foreign Application Priority Data

Jun. 2, 2020 (KR) ........................ 10-2020-0066395

(51) Int. Cl.
*B62D 25/08* (2006.01)
*B60L 53/12* (2019.01)

(52) U.S. Cl.
CPC .............. *B60L 53/12* (2019.02); *B62D 25/08* (2013.01); *B62D 25/085* (2013.01)

(58) Field of Classification Search
CPC ........ B60L 53/12; B62D 25/08; B62D 25/085
USPC .................................................... 180/54.1
See application file for complete search history.

(56) References Cited

U.S. PATENT DOCUMENTS

| | | | | |
|---|---|---|---|---|
| 9,914,363 | B2* | 3/2018 | Lee | H02J 50/90 |
| 10,245,963 | B2* | 4/2019 | Ansari | B60L 53/126 |
| 10,518,659 | B2* | 12/2019 | Haynes | B60L 53/30 |
| 10,899,245 | B2* | 1/2021 | Haynes | B60L 53/12 |
| 2014/0232331 | A1* | 8/2014 | Stamenic | B60L 50/52 320/108 |
| 2016/0185236 | A1* | 6/2016 | Lee | B60L 53/12 320/106 |
| 2018/0251102 | A1* | 9/2018 | Han | H01M 50/578 |
| 2019/0111792 | A1* | 4/2019 | Haynes | B60L 53/22 |
| 2020/0086752 | A1* | 3/2020 | Haynes | B60L 53/12 |

FOREIGN PATENT DOCUMENTS

KR 10-2004-0034028 A 4/2004

* cited by examiner

*Primary Examiner* — James A Shriver, II
*Assistant Examiner* — Hilary L Johns
(74) *Attorney, Agent, or Firm* — Lempia Summerfield Katz LLC (57) ABSTRACT

An apparatus for preventing a sub-frame of an electric vehicle with a wireless charging pad from being pushed back includes: a push bracket member having one side portion coupled to a front end module provided in front of a sub-frame of the electric vehicle and extending to be disposed between the sub-frame and a wireless charging pad mounted below the sub-frame. Upon a forward vehicle collision, the apparatus can induce deformation of the sub-frame equipped with the wireless charging pad to prevent the sub-frame from being pushed backward.

14 Claims, 11 Drawing Sheets

APPARATUS FOR PREVENTING SUB-FRAME OF ELECTRIC VEHICLE WITH WIRELESS CHARGING PAD FROM BEING PUSHED BACKWARD

CROSS-REFERENCE TO RELATED APPLICATION

This application claims priority to and the benefit of Korean Patent Application No. 10-2020-0066395, filed on Jun. 2, 2020, the entire contents of which are incorporated herein by reference.

FIELD

The present disclosure relates to an apparatus for preventing a sub-frame from being pushed backward upon a collision of a vehicle equipped with a wireless charging pad for charging an electric vehicle.

BACKGROUND

The statements in this section merely provide background information related to the present disclosure and may not constitute prior art.

Wireless charging technology using a wireless charging pad has been developed to solve a long charging time of a battery, a short mileage, and inconvenience of charging which are becoming technical problems with the increase of electric vehicles.

Figure 1:
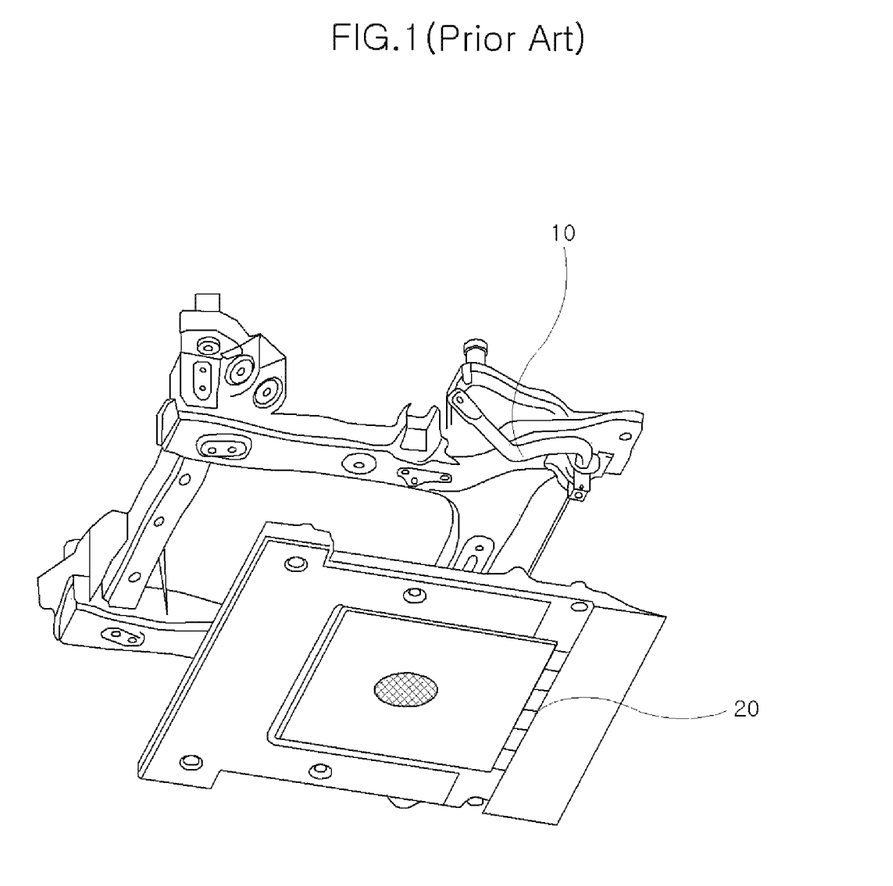
FIG. 1 is a diagram illustrating a mounting relationship of a wireless charging pad.

Referring to FIG. 1, a wireless charging pad 20 is mounted in a lower portion of a front power electric (PE) room, that is, a sub-frame 10, for the purpose of a position of a lower end of a high voltage battery floor, a limitation of a ground clearance, suitability of a wiring layout, and charging convenience of a user.

However, unlike other parts which absorb and distribute collision energy while being sequentially compressed and deformed by being connected to a load path in a situation of a forward vehicle collision, since the wireless charging pad 20 is independently fixed to the sub-frame 10, the wireless charging pad 20 is not included in the load path of the collision so that rigidity of the sub-frame 10 is increased to suppress deformation of the sub-frame 10 during the collision.

Consequently, a mounting bolt of the sub-frame 10 is easily separated from a side member so that sway of the sub-frame 10 to a rear side is increased to hit a high-voltage battery such that the high-voltage battery may be damaged.

The contents described in the above are to aid understanding of the background of the present disclosure and may include what is not previously known to a person of ordinary skill in the art to which the present disclosure pertains.

SUMMARY

The present disclosure provides an apparatus capable of preventing a sub-frame from being pushed backward by inducing deformation of the sub-frame equipped with a wireless charging pad upon a forward vehicle collision.

Other objects and advantages of the present disclosure can be understood by the following description and become apparent with reference to the exemplary forms of the present disclosure.

In one form of the present disclosure, an apparatus for preventing a sub-frame of an electric vehicle with a wireless charging pad from being pushed backward includes: a push bracket member having one side portion coupled to a front end module provided in front of a sub-frame of the electric vehicle and extending to be disposed between the sub-frame and a wireless charging pad mounted below the sub-frame.

In addition, the one side portion of the push bracket member may be coupled to a front surface of the front end module.

In one form, a front bolt passing through a front mounting portion of the wireless charging pad may pass through a front bolt through-hole formed in the push bracket member to be engaged with the sub-frame.

In another form, a middle bolt passing through a middle mounting portion formed behind the front mounting portion of the wireless charging pad may pass through a middle bolt through-hole formed in the push bracket member to be engaged with the sub-frame.

In some forms of the present disclosure, the push bracket member may be provided as a pair of push bracket members to be disposed at positions corresponding to both side modules constituting the sub-frame.

In some forms of the present disclosure, the apparatus may further include: a plastic hinge bracket which is mounted on a rear mounting portion of the wireless charging pad, and in which a bracket through-hole is formed, and a hinge member which is hinge-coupled to an upper end of the plastic hinge bracket and in which a hinge through-hole is formed.

Here, the hinge member may be hinge-coupled to an upper end of a rear side of the plastic hinge bracket.

In another form, a rear bolt passing through the rear mounting portion may pass through the bracket through-hole and the hinge through-hole to be engaged with the sub-frame.

In some forms of the present disclosure, the hinge through-hole may have a diameter corresponding to a thread portion of the rear bolt, and a head portion of the rear bolt may be inserted into the bracket through-hole.

Further, a rubber member may be inserted between an inner surface of the bracket through-hole and the head portion of the rear bolt.

In another form of the present disclosure, an apparatus for preventing a sub-frame of an electric vehicle with a wireless charging pad from being pushed backward includes: a push bracket member which is disposed between a sub-frame and a wireless charging pad mounted below the sub-frame and in which a front bolt through-hole corresponding to a front mounting portion of the wireless charging pad is formed, a plastic hinge bracket which is mounted on a rear mounting portion of the wireless charging pad and in which a bracket through-hole is formed, and a hinge member which is hinge-coupled to an upper end of the plastic hinge bracket and in which a hinge through-hole is formed.

In other form, a rear bolt passing through the rear mounting portion may pass through the bracket through-hole and the hinge through-hole to be engaged with the sub-frame, the hinge through-hole may have a diameter corresponding to a thread portion of the rear bolt, and a head portion of the rear bolt may be inserted into the bracket through-hole.

In some forms of the present disclosure, a rubber member may be inserted between an inner surface of the bracket through-hole and the head portion of the rear bolt.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference should be made to the accompanying drawings that illustrate exemplary forms of the present disclosure, and to the description in the accompanying drawings in order to fully understand the present disclosure and operational advantages of the present disclosure, and objects attained by practicing the present disclosure.

In describing exemplary forms of the present disclosure, known technologies or duplicated descriptions may be reduced or omitted to avoid obscuring appreciation of the disclosure by a person of ordinary skill in the art.

Figure 2:
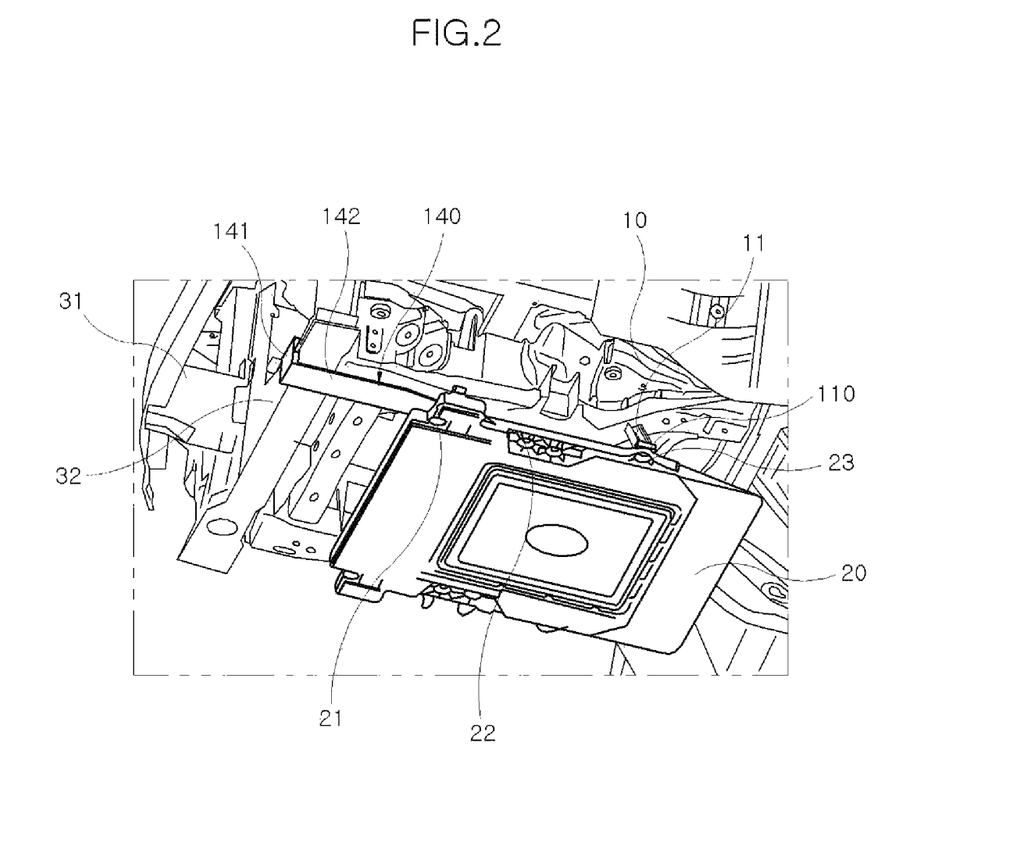
FIG. 2 is a diagram illustrating a state in which an apparatus for preventing a sub-frame from being pushed backward in one form of the present disclosure is applied to a vehicle.
Figure 3:
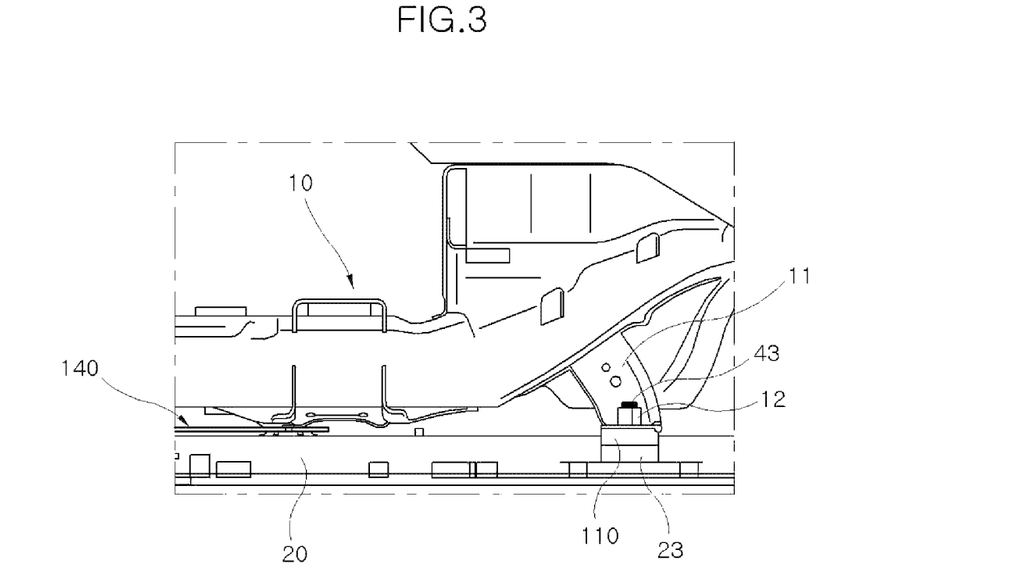
FIG. 3 is a diagram illustrating a shape of a side surface of a part of FIG. 2.

FIG. 2 illustrates a state in which an apparatus for preventing a sub-frame from being pushed backward in one form of the present disclosure is applied to a vehicle, FIG. 3 illustrates a shape of a side surface of a part of FIG. 2, and FIGS. 4A, 4B, and 4C illustrate an operating state of a part of the apparatus for preventing a sub-frame from being pushed backward according to one form of the present disclosure.

Hereinafter, the apparatus for preventing a sub-frame of an electric vehicle with a wireless charging pad from being pushed backward will be described with reference to FIGS. 2 to 4C.

The present disclosure is applied to an electric vehicle in which a wireless charging pad is mounted in a sub-frame to inhibit or prevent an impact from being applied to a high voltage battery due to the pushing back of the sub-frame without being deformed upon a forward vehicle collision.

A bumper is mounted on a front side of a vehicle so as to protect the vehicle and passengers from a forward collision, a crash box 31 is mounted so as to support a rear side of a back beam constituting the bumper, and an impact is transferred to a front end module 32 mounted behind the crash box 31.

The sub-frame 10 is disposed behind the front end module 32, supports an engine and a transmission at a lower portion of a vehicle body, and secures structural rigidity of the vehicle to facilitate a load transfer. The sub-frame 10 is made of a substantially rectangular-shaped frame including a front member, a rear member, and side members formed on both sides of each of the front member and the rear member.

A wireless charging pad 20 for charging a high voltage battery is mounted below the sub-frame 10.

In order to mount the wireless charging pad 20, a front mounting portion 21, a middle mounting portion 22, and a rear mounting portion 23 are sequentially formed in the wireless charging pad 20 from the front side, and a front bolt 41, a middle bolt 42, and a rear bolt 43 pass through the front mounting portion 21, the middle mounting portion 22, and the rear mounting portion 23 to be coupled to a lower portion of the sub-frame 10.

Each of the front mounting portion 21, the middle mounting portion 22, and the rear mounting portion 23 is formed in pairs to correspond to both side members of the sub-frame 10.

In particular, a rear mounting bracket 11 is formed at a position corresponding to the rear mounting portion 23 of the wireless charging pad 20 of the sub-frame 10, and the rear bolt 43 passes through a bolt through-hole 24 formed in the rear mounting portion 23 to be coupled to a weld nut 12 mounted in the rear mounting bracket 11.

The apparatus for preventing a sub-frame from being pushed backward of the present disclosure for breaking a relationship between the sub-frame 10 and the wireless charging pad 20, which are coupled as described above, upon a vehicle collision includes a plastic hinge bracket 110, a hinge member 120, a rubber member 130, and a push bracket member 140.

One side portion of the push bracket member 140 is fixed to the front end module 32, and the push bracket member 140 is disposed between the sub-frame 10 and the wireless charging pad 20.

More specifically, the push bracket member 140 is formed of a fixing portion 141 of which one side portion is fixed to a front surface of the front end module 32, and a bolt cutting portion 142 bent from the fixing portion 141 and formed to extend to be disposed between the sub-frame 10 and the wireless charging pad 20.

In addition, bolt through-holes 143 and 144 are formed in the bolt cutting portion 142, and thus the front bolt 41 and the middle bolt 42 are provided to pass through a front bolt through-hole 143 and a middle bolt through-hole 144, respectively.

That is, upon a forward collision in a state in which the push bracket member 140 is coupled to the front end module 32 and a position of the push bracket member 140 is fixed by the front bolt 41 and the middle bolt 42, when the crash box 31 is compressed and then the front end module 32 is sequentially compressed and deformed due to a collision load path, the front end module 32 is moved backward by compression and generates shear forces in the front bolt 41 and the middle bolt 42 so that shear fractures of the front bolt 41 and the middle bolt 42 are induced.

Consequently, the sub-frame 10 and the wireless charging pad 20 are separated from each other once the front bolt 41 and the middle bolt 42 are sheared, and only the rear mounting is maintained.

Figure 4A:
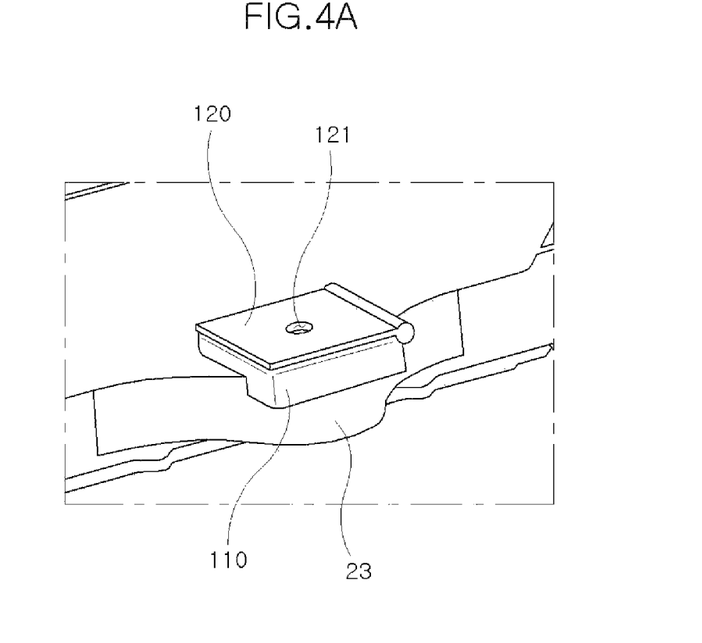
FIGS. 4A, 4B, and 4C are diagrams illustrating an operating state of a part of the apparatus for preventing a sub-frame from being pushed backward in one form of the present disclosure.
Figure 4B:
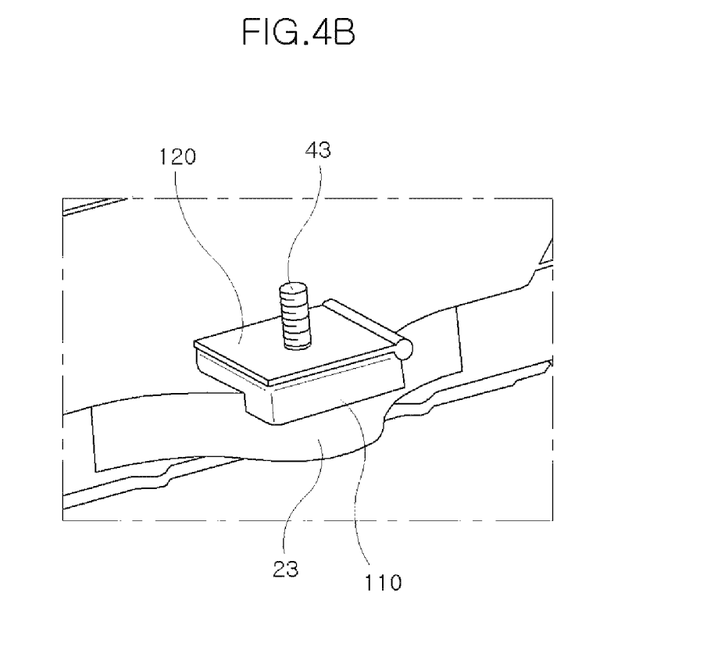
Figure 4C:
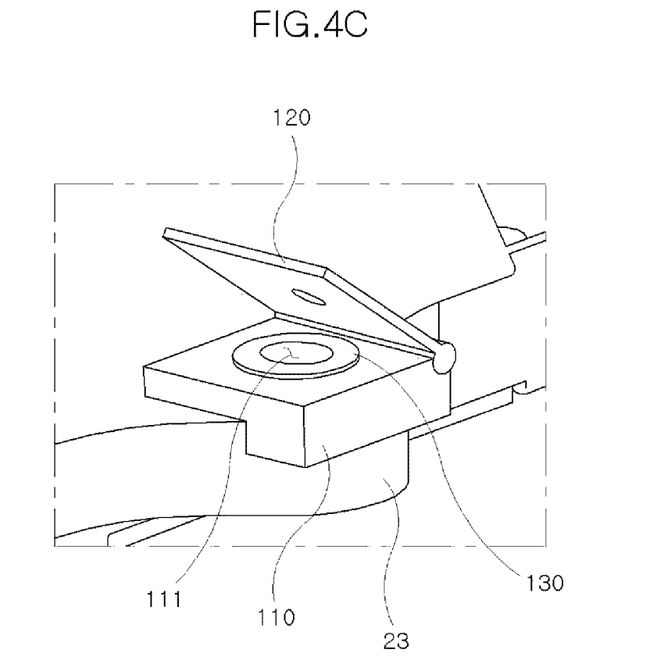

After the front bolt 41 and the middle bolt 42 are sheared, the plastic hinge bracket 110 allows the sub-frame 10 to be deformed with only its own rigidity.

The plastic hinge bracket 110 is mounted on the rear mounting portion 23 of the wireless charging pad 20, and the hinge member 120 is hinge-coupled to one side of the plastic hinge bracket 110.

In one form, the hinge member 120 may be hinge-coupled to an upper end of a rear side of the plastic hinge bracket 110.

To correspond to the bolt through-hole 24 of the rear mounting portion 23, a bracket through-hole 111 is formed in the plastic hinge bracket 110, and a hinge through-hole 121 is also formed in the hinge member 120. Thus, the rear bolt 43 is inserted into the plastic hinge bracket 110 through the bolt through-hole 24, and then a thread portion of the rear bolt 43 passing through the bracket through-hole 111 is inserted into the weld nut 12 mounted in the rear mounting bracket 11 of the sub-frame 10 so that a coupling is achieved.

Since a diameter of the hinge through-hole 121 corresponds to a diameter of the thread portion of the rear bolt 43, the diameter of the hinge through-hole 121 may be formed to be smaller than a diameter of the bracket through-hole 111 of the plastic hinge bracket 110 into which a head portion of the rear bolt 43 is inserted.

In addition, the rubber member 130 is inserted between the head portion of the rear bolt 43, which is inserted into the bracket through-hole 111 of the plastic hinge bracket 110, and an inner surface of the bracket through-hole 111. Upon a forward vehicle collision, the rubber member 130 allows the rear bolt 43 to be smoothly released from the bracket through-hole 111 of the plastic hinge bracket 110.

As described above, the plastic hinge bracket 110, the push bracket member 140, and other components therefor may be configured in pairs to correspond to both side modules of the sub-frame 10.

To supplementally describe the plastic hinge, in a beam being bent, when a load is increased over an elastic limit of a material of the beam, a plastic zone begins from an outermost edge of the beam and, finally, an entirety of a cross section of the beam enters the plastic zone. That is, one side of a neutral axis is plastically compressed and the other side thereof is subjected to plastic tension. In such a state, the beam is continuously pivoted as a hinge in a state of directly maintaining a bending moment at a constant value. The bending moment in such a state is referred to as a full plastic moment, and a mechanical state of a cross section having the full plastic moment is referred to as a plastic hinge.

Hereinafter, an operating state due to the apparatus for preventing a sub-frame from being pushed backward according to the present disclosure upon a vehicle collision will be described with reference to FIGS. 5 to 9.

Figure 5:
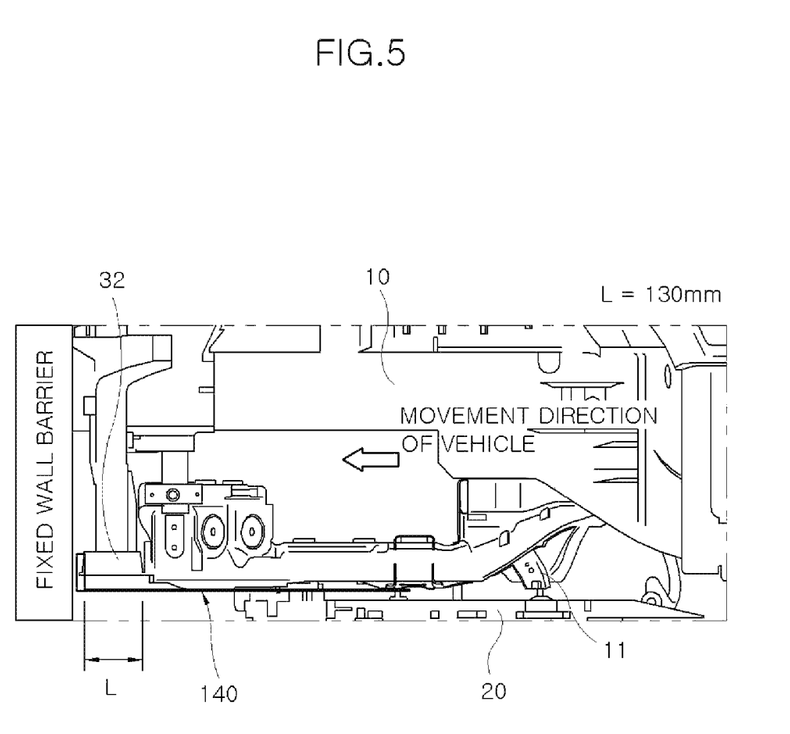
FIG. 5 is a diagram illustrating a shape of a side surface before a vehicle collision.
Figure 6:
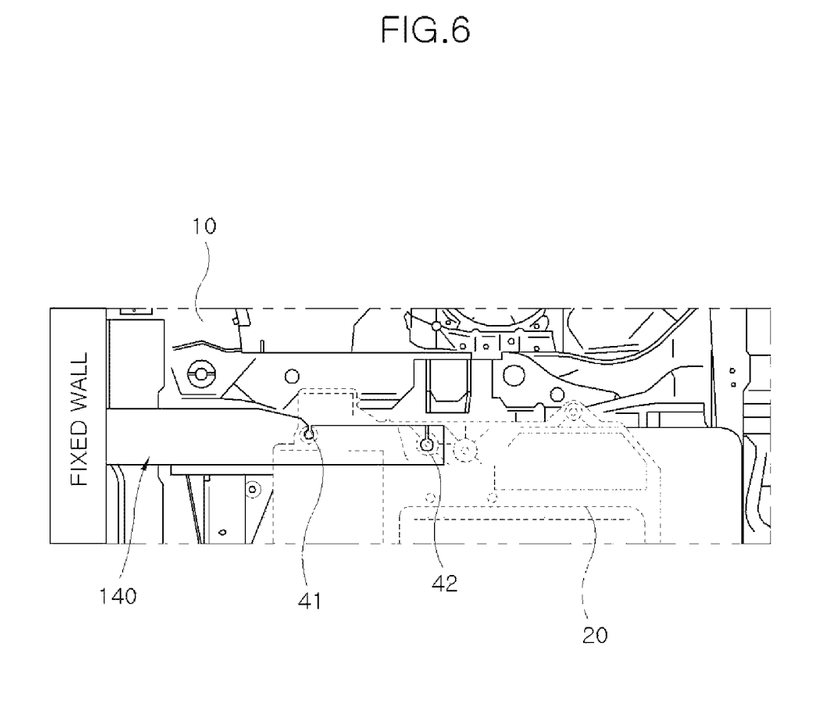
FIG. 6 is a diagram illustrating a shape of a lower surface before the vehicle collision.

FIG. 5 illustrates a shape of a side surface before a vehicle collision, and FIG. 6 illustrates a shape of a lower surface before the vehicle collision. The push bracket member 140 is located between the sub-frame 10 and the wireless charging pad 20, and the front bolt 41 and the middle bolt 42 pass through the push bracket member 140 to be coupled to the sub-frame 10.

Figure 7:
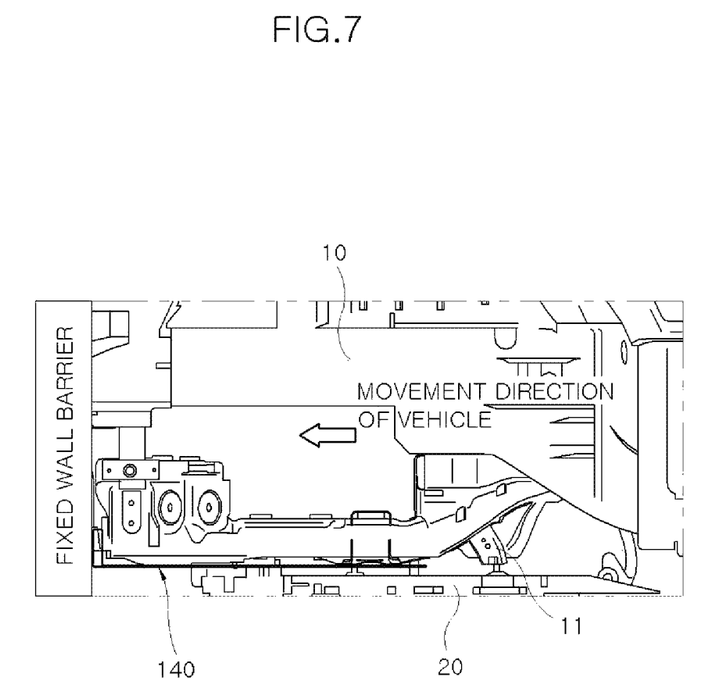
FIG. 7 is a diagram illustrating a shape of the side surface after vehicle collision.
Figure 8:
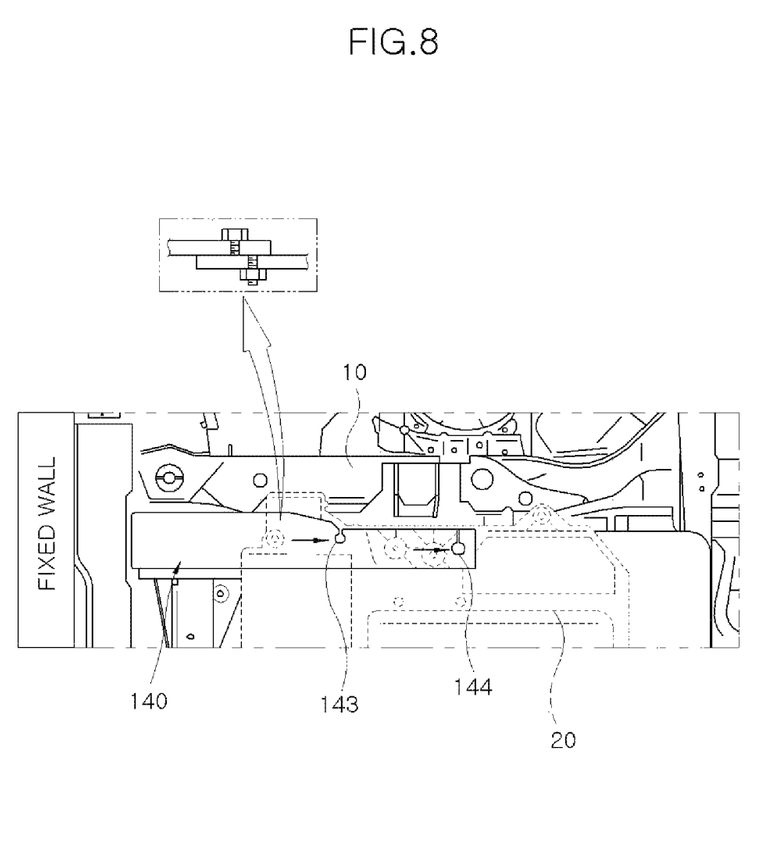
FIG. 8 is a diagram illustrating a shape of the lower surface after the vehicle collision.

FIG. 7 illustrates a shape of the side surface after vehicle collision, and FIG. 8 illustrates a shape of the lower surface after the vehicle collision. Upon a forward vehicle collision, due to the collision load path, the crash box 31 is compressed and then the front end module 32 is sequentially compressed and deformed.

Consequently, the push bracket member 140 is moved backward by as much as compression L of the front end module 32 to generate shear forces in the front bolt 41 and the middle bolt 42 so that shear fractures of the front bolt 41 and the middle bolt 42 are induced.

Consequently, the sub-frame 10 and the wireless charging pad 20 are separated from each other due to the sheared front bolt 41 and the sheared middle bolt 42, and only the rear mounting is maintained.

Figure 9A:
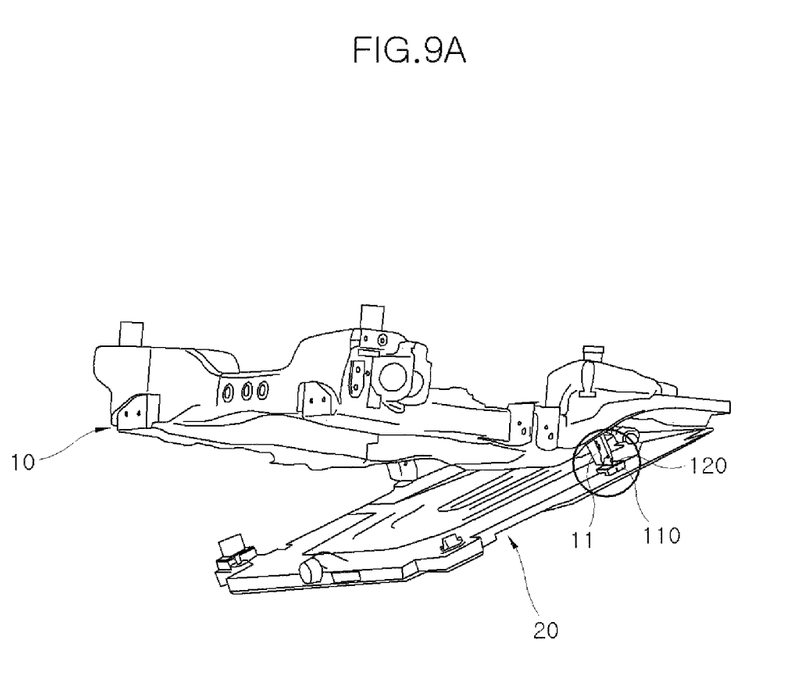
FIG. 9A is a diagram illustrating a state of the apparatus for preventing a sub-frame from being pushed backward in one form of the present disclosure after the vehicle collision.
Figure 9B:
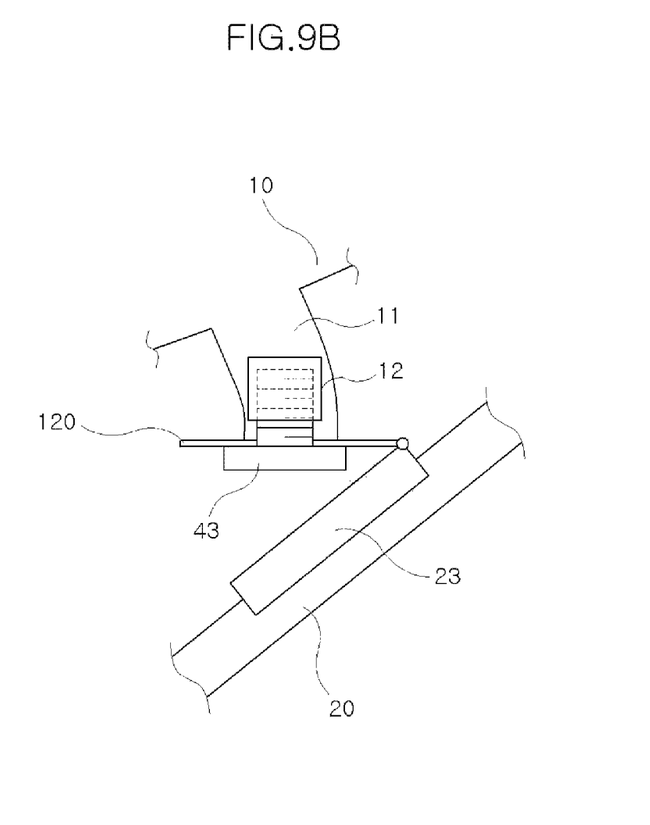
FIG. 9B is an enlarged view of a part identified in FIG. 9A.

When only the rear mounting is maintained, a state as shown in FIG. 4C is reached. That is, as shown in FIGS. 9A and 9B, the wireless charging pad 20 is moved downward due to its own weight except for the rear mounting portion 23, and thus the wireless charging pad 20 becomes the state as shown in FIG. 4C due to a pivoting operation of the hinge member 120.

In this case, the rear bolt 43 is released from the plastic hinge bracket 110 of the rubber member 130 and maintains a coupling with the weld nut 12 of the sub-frame 10 together with the hinge member 120.

Therefore, the plastic hinge bracket 110, that is, the wireless charging pad 20, is supported by only an engagement force between the weld nut 12 and the rear bolt 43, and the sub-frame 10 is separated from the wireless charging pad 20 to have only the existing own rigidity so that deformation occurs. Consequently, it is possible to avoid hitting of the high voltage battery due to the pushing backward.

In accordance with an apparatus for preventing a sub-frame of an electric vehicle with a wireless charging pad from being pushed backward according to the present disclosure, upon a forward vehicle collision, a relationship between a sub-frame and a wireless charging pad is broken to induce deformation by lowering rigidity of the sub-frame, and thus it is possible to secure stability of high voltage battery by preventing the sub-frame from being pushed backward.

While the present disclosure has been described with reference to the accompanying drawings, it will be apparent to those skilled in the art that various changes and modifications may be made without departing from the spirit and scope of the present disclosure without being limited to the exemplary forms disclosed herein. Accordingly, it should be noted that such alternations or modifications fall within the present disclosure.

What is claimed is:

1. An apparatus for a sub-frame of an electric vehicle with a wireless charging pad, the apparatus comprising:
    a front end module provided in front of the sub-frame of the electric vehicle;
    a wireless charging pad mounted below the sub-frame;
    a push bracket member disposed between the sub-frame and the wireless charging pad and having one side portion coupled to the front end module; and
    a plastic hinge bracket mounted on a rear mounting portion of the wireless charging pad, wherein a bracket through-hole is formed in the plastic hinge bracket.

2. The apparatus of claim 1, wherein the one side portion of the push bracket member is coupled to a front surface of the front end module.

3. The apparatus of claim 1, wherein a front bolt passing through a front mounting portion of the wireless charging pad is configured to pass through a front bolt through-hole formed in the push bracket member to be engaged with the sub-frame.

4. The apparatus of claim 3, wherein a middle bolt passing through a middle mounting portion formed behind the front mounting portion of the wireless charging pad is configured to pass through a middle bolt through-hole formed in the push bracket member to be engaged with the sub-frame.

5. The apparatus of claim 1, wherein the push bracket member is provided as a pair of push bracket members to be disposed at positions corresponding to both side modules constituting the sub-frame.

6. The apparatus of claim 1, further comprising:
   a hinge member configured to be hinge-coupled to an upper end of the plastic hinge bracket, wherein a hinge through-hole is formed in the hinge member.

7. The apparatus of claim 6, wherein the hinge member is hinge-coupled to an upper end of a rear side of the plastic hinge bracket.

8. The apparatus of claim 6, wherein a rear bolt passing through the rear mounting portion is configured to pass through the bracket through-hole and the hinge through-hole to be engaged with the sub-frame.

9. The apparatus of claim 8, wherein, upon a forward collision, the rear bolt is released from the plastic hinge bracket so that the wireless charging pad is movable downward due to its own weight.

10. The apparatus of claim 8, wherein:
    the hinge through-hole has a diameter corresponding to a thread portion of the rear bolt; and
    a head portion of the rear bolt is inserted into the bracket through-hole.

11. The apparatus of claim 10, wherein a rubber member is inserted between an inner surface of the bracket through-hole and the head portion of the rear bolt.

12. An apparatus for a sub-frame of an electric vehicle with a wireless charging pad, the apparatus comprising:
    a push bracket member disposed between a sub-frame and a wireless charging pad mounted below the sub-frame, wherein a front bolt through-hole corresponding to a front mounting portion of the wireless charging pad is formed in the push bracket member;
    a plastic hinge bracket mounted on a rear mounting portion of the wireless charging pad, wherein a bracket through-hole is formed in the plastic hinge bracket; and
    a hinge member configured to be hinge-coupled to an upper end of the plastic hinge bracket, wherein a hinge through-hole is formed in the hinge member.

13. The apparatus of claim 12, wherein:
    a rear bolt passing through the rear mounting portion is configured to pass through the bracket through-hole and the hinge through-hole to be engaged with the sub-frame;
    the hinge through-hole has a diameter corresponding to a thread portion of the rear bolt; and
    a head portion of the rear bolt is inserted into the bracket through-hole.

14. The apparatus of claim 13, wherein a rubber member is inserted between an inner surface of the bracket through-hole and the head portion of the rear bolt.

* * * * *